United States Patent Office 2,701,184
Patented Feb. 1, 1955

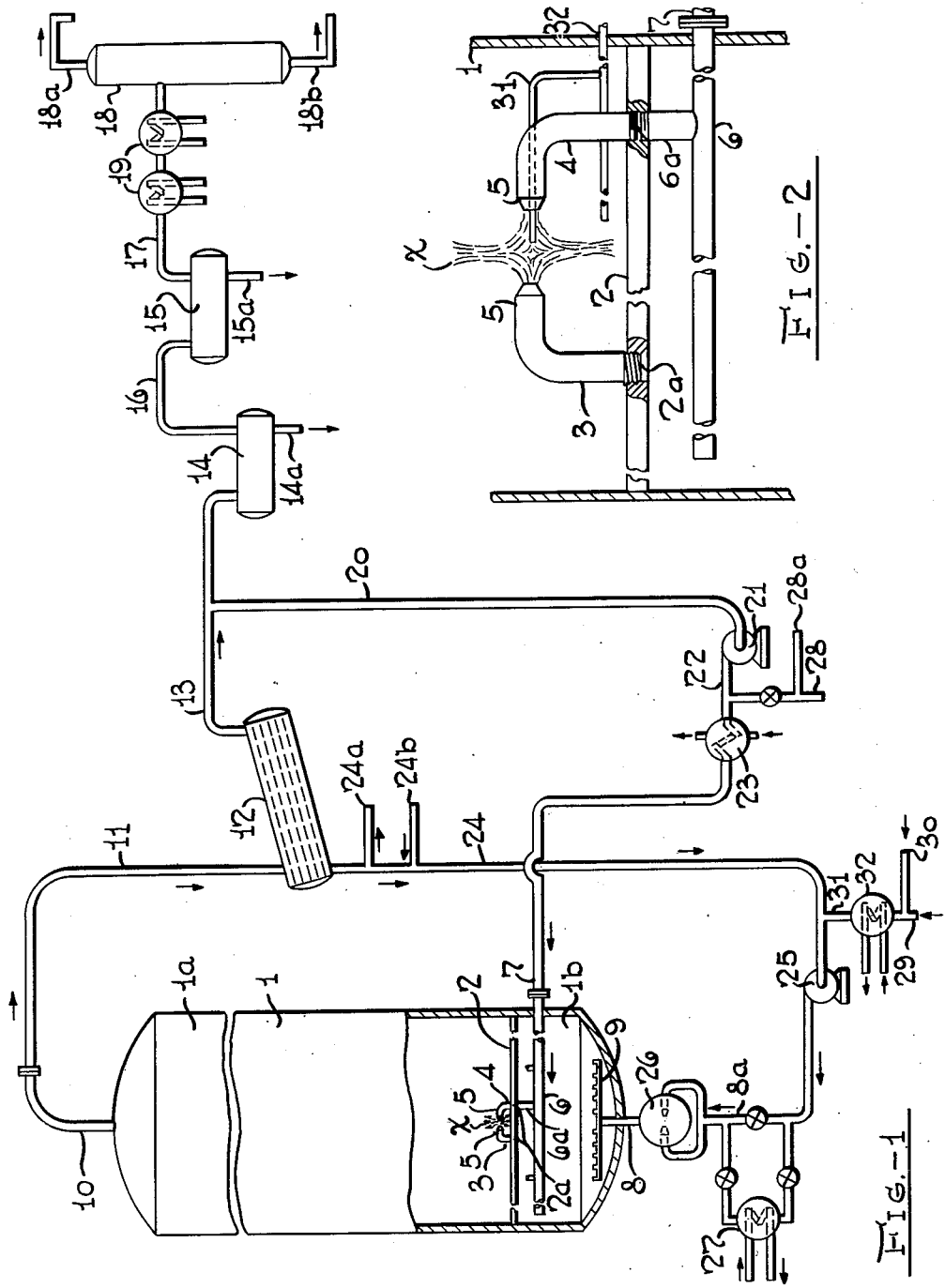

2,701,184

APPARATUS FOR CARRYING OUT CATALYTIC REACTIONS BETWEEN HYDROCARBON MATERIALS

Walter H. Rupp, Mountainside, N. J., assignor to Standard Oil Development Company, a corporation of Delaware Application May 1, 1951, Serial No. 224,010

3 Claims. (Cl. 23—270.5)

The present invention relates to a system for effecting reactions between hydrocarbon materials in the presence of a catalyst for the reaction. More particularly, the invention relates to the synthesis of hydrocarbon materials, as in the manufacture of hydrocarbons having branched chain structures which are especially suitable as automobile and aviation engine fuels, or as constituents of such fuels.

This invention relates especially to means for reacting certain isoparaffin hydrocarbons with olefins to produce improved yields of branched chain paraflinic hydrocarbons boiling within the gasoline range, as in the alkylation of isobutane with butylene in the presence of sulfuric acid as a catalyst material. Although thus specifically applied, the invention contemplates the employment of any suitable hydrocarbon material including isobutane, isopentane and other paraffinic materials capable of chemical combination with olefins to obtain products of the character desired. The invention also contemplates the employment of any suitable catalyst material, in addition to sulfuric acid, such as mixtures of sulfuric and phosphoric acid, hydrofluoric acid and certain complexes of aluminum chloride and boron fluoride. Furthermore, the invention is intended for employment under the usual or conventional range of operating conditions of temperature and pressure.

Characteristically, the olefinic materials contemplated by the present invention and capable of entering into an alkylation reaction with isoparaffinic hydrocarbons may also be polymerized by contact with the catalyst materials such as may be employed for alkylation. This characteristic is due primarily to the greater reactivity of the olefins as compared with the isoparaffins and, in order to avoid the preferential polymerization reaction, or at least to reduce it to a minimum when alkylation is desired, various process expedients have been employed. A most conventional procedure to inhibit concurrent polymerization as well as to prevent other undesirable secondary or side reactions has been to effect catalytic alkylation reactions under conditions designed to avoid intimate contact of the olefins with the catalyst material in the comparative absence of isoparaffins. To accomplish this, it has been customary to provide a substantial excess of isoparaffins in the reaction zone or to dilute the olefin material with a material containing a substantially greater amount of isoparaffins prior to introduction into the reaction zone. For example, the olefins may be diluted or mixed with a portion of the emulsion derived from the reaction zone itself and recycled therefrom, or the olefin material may be introduced in successive increments in a continuous series of reaction zones or stages containing previously emulsified and contacted materials. Under such procedures, it is frequently difficult to adequately control the quantities of the various materials introduced, or their relative proportions in any stage, and also the degree of emulsification or mixing which is accomplished from stage to stage. As a result, there may be areas in any particular zone or stage in which the olefins may come in contact with substantially unemulsified or free catalyst materials to produce the undesired polymerization or other side reactions, and thereby to reduce the yield of alkylation products.

It is an object of the present invention to provide a system for carrying out catalytic reactions of the general character contemplated, and especially to provide means for alkylation of isoparaffins with olefins by means of which polymerization and other side reactions are reduced to a minimum with a resulting improvement in the yields of the desired products obtained. It is a further object of the invention to provide means for reacting isoparaffins with olefins in the liquid phase under any desired conditions of temperature and pressure, and in the presence of an active acid catalyst material including sulfuric acid and any other material comparable to those previously mentioned. A desired end result of the system contemplated according to this invention is to produce greater yields of alkylation or other reaction products, which products will be substantially free from side reaction contaminating materials. A particular object of the invention may be stated to be the provision of a system for alkylating isoparaffins with olefins in the presence of a liquid active acid catalyst material in which the olefins and catalyst materials are introduced in such fashion as to substantially prevent immediate contact of the olefins with the catalyst material to produce polymerization of the olefins to the exclusion of alkylation with isoparaffins. In conjunction with such an objective, it is also an object of the invention to provide an improved means for contacting materials of the character contemplated one with another for the purposes set forth.

The invention and its objects may be more fully understood from the following description when read in conjunction with the accompanying drawings in which Fig. 1 is a diagrammatic, side elevational view of an apparatus suitable for accomplishment of the method according to the present invention, and Fig. 2 is an enlarged vertical section through a preferred means for initially contacting the reactant and catalyst materials under the desired conditions according to the invention.

Referring to the drawings in greater detail, the numeral 1 designates a reaction vessel. This vessel may be of any suitable proportions as required by the volume of materials to be handled and by the residence time required for tre reaction to be carried out therein. For example, in a typical alkylation reaction, the vessel 1 should be of such volume as to permit a residence time of the materials in the reactor vessel of from about 1 minute to about 5 minutes.

A closed reactor vessel 1 is provided with a transverse plate element 2 disposed in vertically spaced relation to the lower end of the vessel, adjacent thereto and dividing the interior of the vessel into upper and lower chambers 1a and 1b respectively. The plate 2 is preferably a perforated plate providing a multiple series of passageways 2a opening therethrough from one compartment to another. The passageways 2a are provided with a series of discharge conduit members 3 and 4 respectively, arranged as pairs, and each provided with a nozzle portion or jet discharge element 5 at the outlet end. In each pair, the jet discharge elements are disposed substantially at right angles to a related conduit member and in substantially aligned, opposed, coaxial spaced relation one to another. Also, in each pair of conduit members, the inlet end of one conduit member 3 communicates directly with the chamber 1b by way of a passageway 2a. The inlet end of the other conduit member 4 communicates with a separate inlet means for one portion of the process materials, such as a header 6, by way of a passageway 2a and header branch line 6a. The header 6 opens outwardly through a wall of the reactor vessel and is connected to a supply conduit line 7. Preferably the conduit elements 3 and 4 and the related nozzle elements 5 are disposed and arranged substantially in the manner as set forth in a copending application for United States Letters Patent filed February 1, 1951 under the Serial No. 208,955, being spaced one from another at a distance of from about 1 to about 20 times the internal diameter of the jet or nozzle 5, and preferably within the range of from about 1 to 5 times such diameter.

A second inlet for process materials is provided by conduit 8 opening into the chamber 1b. If desired, and as shown, the outlet end of conduit 8 may be extended into the chamber 1b into communication with a distributor element such as a header 9. The header 9 may be in any conventional form such as a pipe element perforated to provide for the discharge of a plurality of separate streams into the chamber 1b and the body of materials introduced and maintained therein. An outlet from the reactor and particularly from chamber 1a is provided by means of the conduit 10 at the upper end thereof. The outlet 10 is connected by means of a line 11 to a separator or settler vessel 12 which may be any conventional type of vessel providing for separation of an emulsion of immiscible materials into its respective lighter and heavier components. An outlet conduit 13 is provided for the lighter portion of the materials separated in the vessel 12 and may be connected to additional separator vessels such as vessels 14 and 15 disposed in series relationship. As shown, two additional stages of separation are provided. The vessel 14 is provided with an outlet 14a for the residual heavier component of the material introduced thereto by way of line 13 and a conduit connection 16 for transfer of the lighter component into the vessel 15. The vessel 15 in turn is provided with an outlet 15a for residual heavier components of the materials introduced thereinto and an outlet conduit 17 for the lighter component of such materials.

As shown, the system illustrates an operation in which the lighter component is a fractionable mixture including a product of the reaction carried out in the vessel 1 and an excess portion of one of the reactant materials. The conduit 17 therefore is connected to a fractionation tower 18 provided with conduit means 18a and 18b for withdrawal of the principal components of the materials fractionated therein. Heat exchangers 19 for the addition or abstraction of heat from the materials conveyed to the fractionating tower 18 may be connected in the conduit 17 as shown. Other usual and conventional apparatus elements and relationships may be employed in the system even though omitted in the drawing for simplicity.

A bypass conduit means 20 is connected at one end to the conduit 13 and at the other end to the inlet of a pump 21, the discharge of pump 21 being connected by way of line 22 to the inlet of a heat exchanger 23, the outlet of exchanger 23 being connected to the header 6 by means of supply conduit 7. The settler 12 is also provided with an outlet for the heavier component of the materials introduced thereto by way of line 11, such outlet being by way of conduit 24 connected at one end to the lower outlet of the vessel 12 and at the other end to the inlet of a pump 25. A conduit 24a provides for withdrawal of this heavier component from the system, while a conduit 24b provides for introduction of additional quantities thereof. The outlet of pump 25 is connected to the conduit 8. As shown, this connection is made by way of a line 8a and a mixing device 26. Also, if desired, heat exchanger means 27 may be connected in the flow path provided, with suitable valves in the conduit 8a and in the connections with heat exchanger 27 allowing for alternate paths of circulation. Means for introducing fresh feed materials into the system are provided by means of conduits 28 and 28a connected into the line 22, and by means of conduits 29 and 30 connected to the conduit 24 by way of conduit 31. As shown, a heat exchanger 32 is provided in the line 31. Suitable control valves and control mechanisms, though not shown, may be provided in any or all conduit connections as required for proper operation of the system.

The system as illustrated by Fig. 1 is suitable for employment under any circumstances in which two or more immiscible materials of different specific gravities are to be contacted, and is particularly useful under circumstances in which such contact is made for the purpose of initiating a chemical reaction involving the materials, and in which the reactants and the reaction products may be separated from the catalyst material employed by gravity and in which the products of the reaction may be removed from any excess of reactant materials by fractionation. More specifically, the system is particularly adapted for employment in the alkylation of isoparaffins with an olefin, in the presence of a liquid active acid catalyst material such as concentrated sulfuric acid. For example, the system is suitable for the alkylation of isobutane and butylene in the presence of sulfuric acid having the strength of from about 90 to about 98%, in which the alkylation reaction is carried out at a temperature of from about 30° to about 60° F. In such a reaction, it is desirable that the isobutane be present in the reactant materials in an amount considerably in excess of the butylene in order to insure complete utilization of the latter material. It is also desirable that the operation provide against uncontrolled polymerization of the butylene component.

In a typical operation, isoparaffins and olefins may be introduced into the system in such proportions as to result in a total feed in which the several components are present substantially as follows:

| Component: | Percent total feed |
|---|---|
| $C_3$ | 3 |
| Butylene | 15 |
| Isobutane | 70 |
| Normal butane | 12 |

Normally, the olefin material initially fed into the system may be supplied by a composition substantially as follows:

| Component: | Percentage olefin feed |
|---|---|
| $C_3$ | 1 |
| Butylene | 40 |
| Isobutane | 47 |
| N-butane | 12 |

In order to accomplish the desired proportions of butylene to isobutane in the reaction mixture, therefore, additional isobutane must be made available from some other source. A suitable feed material may be obtained by recycling unreacted isobutane as later described. This material may have a composition substantially as follows:

| Component: | Percent isoparaffin feed |
|---|---|
| $C_3$ | 3 |
| Isobutane | 85 |
| N-butane | 12 |

In operation of the system illustrated by Fig. 1 for alkylation of isoparaffins with olefins and particularly with reference to the alkylation of isobutane and butylene, a major portion of the fresh feed isobutane will be introduced into the system by way of conduit 29 passing therefrom through conduits 31 and 24, pump 25, line 8a and conduit 8 into the chamber 1b. In initiating the process, an acid liquid catalyst material such as sulfuric acid will be introduced by way of line 24b into the line 24 and thence by way of pump 25, line 8a and conduit 8 into the lower chamber 1b along with the isobutane introduced by way of conduits 29 and 31. The isobutane and catalyst thus introduced will be mixed by means of the pump 25, and if employed, the mixing device 26, entering the chamber 1b as an emulsion and passing thence by way of the conduit elements 3 into the chamber 1a, filling the chamber. With the vessel 1 completely filled with the emulsified catalyst and isobutane, the olefin materials are then introduced by way of line 28a as a mixture of such materials with a minor portion of the total isobutane required for the reaction. The mixture passing from conduit 28 into conduit 22 and by way of heat exchanger 23 and conduit 7 into the header 6. Thence, the material is passed through the header branch lines 6a and conduit elements 4 to be discharged from the nozzle members 5 associated therewith as jetted streams so as to impinge upon similar, substantially coaxial streams of the emulsified isobutane and acid issuing from the opposed nozzle members 5, communicating with conduit elements 3.

Preferably, the opposed streams of materials discharged through the conduits 3 and 4 are of such nature and handled in such fashion as to obtain impinging contact of the streams at a point intermediate the end of the nozzle element 5, and so as to produce a saucer-like contact zone, indicated in the drawings by the letter $x$, where the force of contact tends to disperse the material of the respective opposed streams radially as sheets or filaments of the material in intimate surface to surface relationship. Ultimate complete dispersal occurs peripherally of the contact zone into the ambient liquid constituting the main body of materials in the reactor, and producing a region of high turbulence in the immediate vicinity of the saucer-like contact zone. At the same time, each of the opposed jet streams as well as the radially dispersed sheets of the materials in the contact zone itself, will have an induction effect upon the liquids in the surrounding main body of materials in the reactor tending to draw into themselves a certain portion of such surrounding liquids. This induction effect, coupled with high turbulence in the vicinity of the saucer-like dispersal and contact zone, produces intimate remixing and recirculation of materials in the reactor during the period of their residence therein. The effect of impingement of the opposed streams may be further characterized as a planar dispersion effect in which the materials, despite any miscibility or solubility of one with another, tend to form sheets or filaments extending radially outward from the point of impingement and in intimate interfacial contact. A further effect of the form of contact contemplated in this connection is to facilitate the dispersion of heat into the liquid pool surrounding the region of contact where the materials contacted are exothermically reacted, as in the alkylation reaction more particularly contemplated by the present invention. In general, to obtain the operating characteristics of the jetted streams as set forth, and to obtain the desired contact as stated, the operation will be carried on substantially in the manner as set forth with reference to the jet means described in the aforesaid co-pending application for United States Letters Patent.

With the operation of the system initiated substantially in the manner described, operation is continued by removing from the reactor a portion of the contacted and emulsified materials therein, by way of the outlet 10 and conduit 11, into the separator vessel 12. During passage through this vessel, the materials removed from the reactor are separated into the respective lighter and heavier components. In the alkylation reaction contemplated particularly for purpose of illustration, the lighter component will be a mixture of hydrocarbon materials including isobutane, normal butane and the alkylate produced by the reaction, while the heavier component will be the liquid acid catalyst, and in the specific illustration, sulfuric acid. By dilution and otherwise, the strength of the acid removed from the separator vessel 12 may be reduced to from about 88 to about 92%. This acid is removed from the separator by way of the conduit 24 connected to the outlet of the separator 12 at one end and to the pump 25 at the other end. The strength of the acid may be maintained at a substantially constant level by withdrawal of a certain portion of spent acid by way of line 24a and the addition of an equivalent amount of fresh acid by way of the line 24b. As previously noted, a fresh feed isobutane cut may be introduced into the line 24 by way of the conduits 29 and 31 through the heat exchanger 32. In the alkylation system being described, this heat exchanger will be a cooler reducing the temperature of the fresh feed to a temperature of from about 25° to about 40° F. To prevent ice formation in the cooling step, it may be found desirable to add a small quantity of acid to the fresh feed by way of the conduit line 30. It is to be noted that the acid material withdrawn from the separator vessel 12 is intended to be substantially free of hydrocarbon materials including the alkylate product.

The lighter component, in this instance, the hydrocarbon materials, withdrawn from the separator vessel 12 by way of the conduit line 13 is intended to have a substantially negligible acid content. A portion of the materials, removed by way of the line 13, is bypassed and recirculated to the reactor by way of the conduit 20, pump 21, line 22, and heat exchanger 23. The material passed therethrough is reduced from its residual reaction temperature to a temperature of from about 25° F. to about 40° F., being discharged at such temperatures into the header 6 and thence, by way of the branch lines 6a and conduits 4, to be discharged into opposed impinging relation with a stream of acid from the line 24 combined with the fresh feed isobutane, as previously mentioned. The most reactive component of the reaction, such as the fresh feed olefin material, plus a minor portion of the fresh feed of the least reactive material, namely, the isobutane cut, is added to the recirculated material passed through the line 22. In view of the fact that the material delivered by way of line 20 and through pump 21 and line 22 is substantially free of catalyst, the addition of the most reactive material at this point does not result in any preliminary reaction effect between the materials, or with themselves, prior to contact in the presence of catalyst in the reaction zone or vessel, thereby avoiding the formation of undesired reaction products.

A major portion of the lighter component withdrawn from the separator vessel 12 is intended to be recirculated by way of the line 20. The minor portion or the balance of this lighter component, containing the desired end product, is withdrawn from the reaction system and the end product recovered therefrom. As shown, this material is subjected to further separator treatment to remove any remaining catalyst material which may be contained therein. This is accomplished, in the system illustrated, by means of additional separator or settler vessels 14 and 15 connected in series by way of the conduit 16. Spent catalyst material is withdrawn from the vessels 14 and 15 by way of the lines 14a and 15a respectively. Any suitable number of separator vessels may be employed in the series, the material recovered from the final stage being led by way of the conduit 17 through heat exchangers, as required to add or remove heat, and introduced into a fractionating vessel 18, or any other suitable apparatus, as required for recovery of the desired product from the total material withdrawn. In the system contemplated for the purpose of illustration, in which olefin has been reacted with isobutane, the alkylate product of the reaction is removed from the fractionator 18 by way of the line 18b for such further purification or treatment as may be desired. The material thus removed may contain a certain portion of unreacted normal butane derived from the original fresh feed materials. The material taken overhead from the vessel 18 by way of the line 18a will contain a high proportion of isobutane and may be recirculated and re-introduced into the system by way of either the line 28 or the line 29. Initial feed of isobutane to the system, as well as make-up isobutane may be derived from any suitable source, including a narrow cut obtained from stabilization of natural gasoline, or from a catalytic cracking operation by fractionation of gaseous materials resulting therefrom.

In utilization of the method as contemplated by the present invention for the alkylation of isoparaffins with an olefine in which the reactant materials substantially conform to those as set forth above as illustrating a typical operation, the fresh feed material introduced by way of line 29 is contemplated as being in an amount of from 30,000 to 50,000 barrels per stream day and comprising from 70% to 90% isobutane in a composition substantially comparable to that indicated to be a suitable feed material. The fresh feed olefin material introduced by way of the inlet line 28 is contemplated to be a material such as referred to in the foregoing description as a suitable olefin material and will comprise about 10,000 barrels per stream day. These materials are to be contacted in the reactor 1 in combination with recycled materials so as to produce a proportional relationship of acid to hydrocarbon materials in the relation of from about 20 to about 80 parts of acid. The introduction and withdrawal of materials is to be adjusted so as to provide for a reaction time in the zone x of from about 0.10 seconds to about 10 seconds, with a residence time in the reactor vessel of from about 0.5 to about 5.0 minutes. The total feed of acid and the fresh feed recycled isobutane cut is contemplated to be from about 130,000 to about 250,000 barrels per stream day, of which about 100,000 to 200,000 barrels per stream day are recycled acid with the fresh feed added thereto and passed through the line 24. About 100,000 to about 250,000 barrels per stream day of recycled hydrocarbon material in which the isobutane fraction constitutes from 60 to 85% of the total will be supplied to the reactor by way of line 20. Emulsion removed from the reactor by way of the line 11 will amount to from about 300,000 to about 400,000 barrels per stream day, of which from about 40,000 to about 50,000 barrels per stream day will be diverted to the fractionating tower 18 for separation of alkylate as an end product. Of this total amount, about 6,000 barrels per stream day of alkylate may be recovered.

Normally, material supplied to the reactor by way of line 7 and header 6 should be introduced at temperatures of from about 25° F. to about 40° F., while the materials supplied to the reactor by way of line 8 and header 9 should be at a temperature of from about 40° F. to about 80° F. Normally, the reaction is carried out in the reaction vessel at temperatures between about 30° F. and 60° F. As illustrated in Fig. 1, the temperature of the reactant materials supplied to said reactor and the reaction temperature may be maintained by suitable employment of the heat exchangers 23, 27, and 32. Alternately, a portion of the materials supplied to the reaction vessel may be vaporized therein and, after recompression, recirculated to produce an auto-refrigeration effect at the point of contact between said reactant material in the vessel 1.

The materials introduced by way of the headers 6 and 9 should normally be discharged through the nozzles 5 with a pressure drop through the nozzles of from 2 to 20 pounds per square inch, and preferably from about 4 to about 10 pounds per square inch. It is to be noted, however, that the conditions of operation for the alkylation of an olefin with an isoparaffin as set forth herein for the purpose of illustration will substantially conform to such condtions as are conventionally required by existing methods of operation and such variations therefrom as may occur will generally be in the direction of theoretically improved conditions as determined by prior experience with such conventional methods and previously not generally obtainable. As thus far disclosed, a primary teaching of the invention resides in the method whereby contact between the most reactive material and the liquid catalyst is substantially avoided prior to the initial contact of such materials in a reaction zone and in a manner particularly provided to obtain a maximum reaction effect with a minimum degree of side reactions interfering with the main objective.

An alternative form of the apparatus is particularly illustrated by Fig. 2 of the drawings. As shown, the contacting means consists of the conduit elements 3 and 4 with their related discharge nozzles 5, much the same as illustrated by Fig. 1. In this specific form, however, the highly reactive olefin material is separately introduced by means of individual supply conduit elements 31, which, as shown, are coaxial with the nozzle members 5 associated with the conduits 4 and extending beyond the outlet of the nozzle members 5 substantially to a plane coincident with that established by the point of impingement of the opposed liquid streams discharged from the respective conduits 3 and 4. Although not shown in detail, the conduits 31 are preferably connected to and supplied from a common header means 32 disposed internally of the reactor vessel 1 above the plate member 2, which header is connected through the wall of the vessel 1 with a suitable source of supply for the olefin material such as may be connected into the line 28 of Fig. 1.

The apparatus as thus modified permits a closer control of the supply of olefin materials to the reaction in that these materials are delivered directly to the point of contact between the least reactive material, or isobutane, and the liquid acid catalyst material. In either event, whether the operation is conducted by means of the apparatus illustrated and described with reference to Fig. 1, or the modification according to Fig. 2, an operating advantage is obtained in that by premixing a major portion of the least reactive component with the liquid catalyst in the general form of an emulsion thereof, contact of the most reactive component with the catalyst directly and in the absence of the other component for the reaction is substantially avoided, and thereby reaction of the most reactive component with itself is substantially overcome. By means of the system illustrated and described, and in accordance with the method of operation set forth, the catalyst material is substantially saturated with the least reactive component in such fashion that upon initial contact particularly, some portion of the least reactive material will always be present and available for reaction with the most reactive component.

As compared with conventional systems, the system according to the present invention employing opposed jets for contacting two or more reactive materials in the presence of a liquid active acid catalyst permits improved mixing and reaction conditions to be obtained in the absence of undesirable side reactions. For example, in the operation described for the purpose of illustration, saturating the acid catalyst with a fresh feed isobutane cut in the absence of recycled alkylate product shields the catalyst substantially to avoid olefin extraction or polymerization reactions. In the catalyst-isobutane emulsion supplied through the conduit elements 3, the isobutane component of the reaction is maintained in close proximity to the acid particles and is always present as the olefin materials come into contact with the acid tending to produce a reaction which occurs on the surface of the catalyst. By maintaining such a condition and thereby substantially avoiding undesirable side reactions, the catalyst material does not become degraded as rapidly as in a conventional system, facilitating maintenance of high acid strength without excessive additions of fresh acid. Savings are also obtained in this manner by reduction in the amount of acid required to be restored. Further advantages in such a system are obtained by the reduction in the amount of emulsified materials required to be handled by pumps and heat exchange equipment. This reduction in amounts of emulsified materials also prevents fouling of heat exchangers required for the removal of reaction heat. The system efficiency obtained by reason of the improved selectivity of reaction including the substantial avoidance of extraction and polymerization side reactions will permit employment of a wider range of olefin materials than previously permissible, including fast reacting olefins such as propylene and amylene olefins and even isobutylene. Also, as compared with conventional systems employing multistage olefin injection reactors, the simplified system now disclosed results in considerable savings in equipment costs.

What is claimed is:

1. An apparatus for effecting contact between at least two reactant materials in the presence of a liquid acid catalyst for the reaction between said materials, comprising a contacting vessel adapted to be flooded with a body of said reactive materials and catalyst, maintained as a liquid pool therein, conduit means, including a jet discharge nozzle outlet portion, for introducing a first portion of the least reactive of said materials and said catalyst as a jetted stream thereof into said vessel within the pool of materials maintained therein, conduit means, including a jet discharge nozzle outlet portion, for introducing a second portion of the least reactive of said materials as a jetted stream thereof into said vessel within the pool of materials maintained therein, said respective conduit nozzle outlet portions being disposed in paired, opposed, substantially coaxial alignment and in spaced relation longitudinally of their common axis, and conduit means for introducing the most reactive reactant material into said vessel, said conduit means for the most reactive material being disposed coaxially with and concentrically of the outlet portion of one of the paired conduit means and extending outwardly beyond said outlet portion to terminate intermediate said paired conduit means, and conduit means for continuously withdrawing the contacted materials and catalyst from said vessel, said conduit means for introducing said most reactive material communicating directly with the interior of said vessel and having a discharge outlet on the end thereof extending into the space between the respective paired discharge nozzle outlet portions, terminating at an intermediate point therebetween.

2. An opposed jet discharge fluid contacting device, comprising a pair of hollow tubular conduit elements, each having an outlet nozzle portion disposed in opposed, substantially coaxial, aligned relation one to another, and in spaced relation longitudinally of their common axis, and a third hollow tubular conduit element disposed coaxially with and concentrically of the outlet portion of one of said paired conduit elements extending outwardly beyond said portion to terminate intermediate said paired element portions.

3. A fluid contacting device according to claim 2, in which said third conduit element terminates at a point intermediate said paired element portions which is not more than one half the longitudinal distance between said paired element portions.

References Cited in the file of this patent

UNITED STATES PATENTS

| Number | Name | Date |
|---|---|---|
| 1,394,486 | Foster | Oct. 18, 1921 |
| 1,429,992 | Woegerer | Sept. 26, 1922 |
| 2,082,034 | Smith | June 1, 1937 |
| 2,268,094 | Russell | Dec. 30, 1941 |
| 2,366,460 | Semon | Jan. 2, 1944 |
| 2,379,368 | Matuszak | June 26, 1945 |
| 2,435,028 | Bradley | Jan. 27, 1948 |
| 2,450,174 | Weinrich et al. | Sept. 28, 1949 |
| 2,592,814 | Ludlow | Apr. 15, 1952 |
| 2,597,422 | Wood | May 20, 1952 |